2,591,789

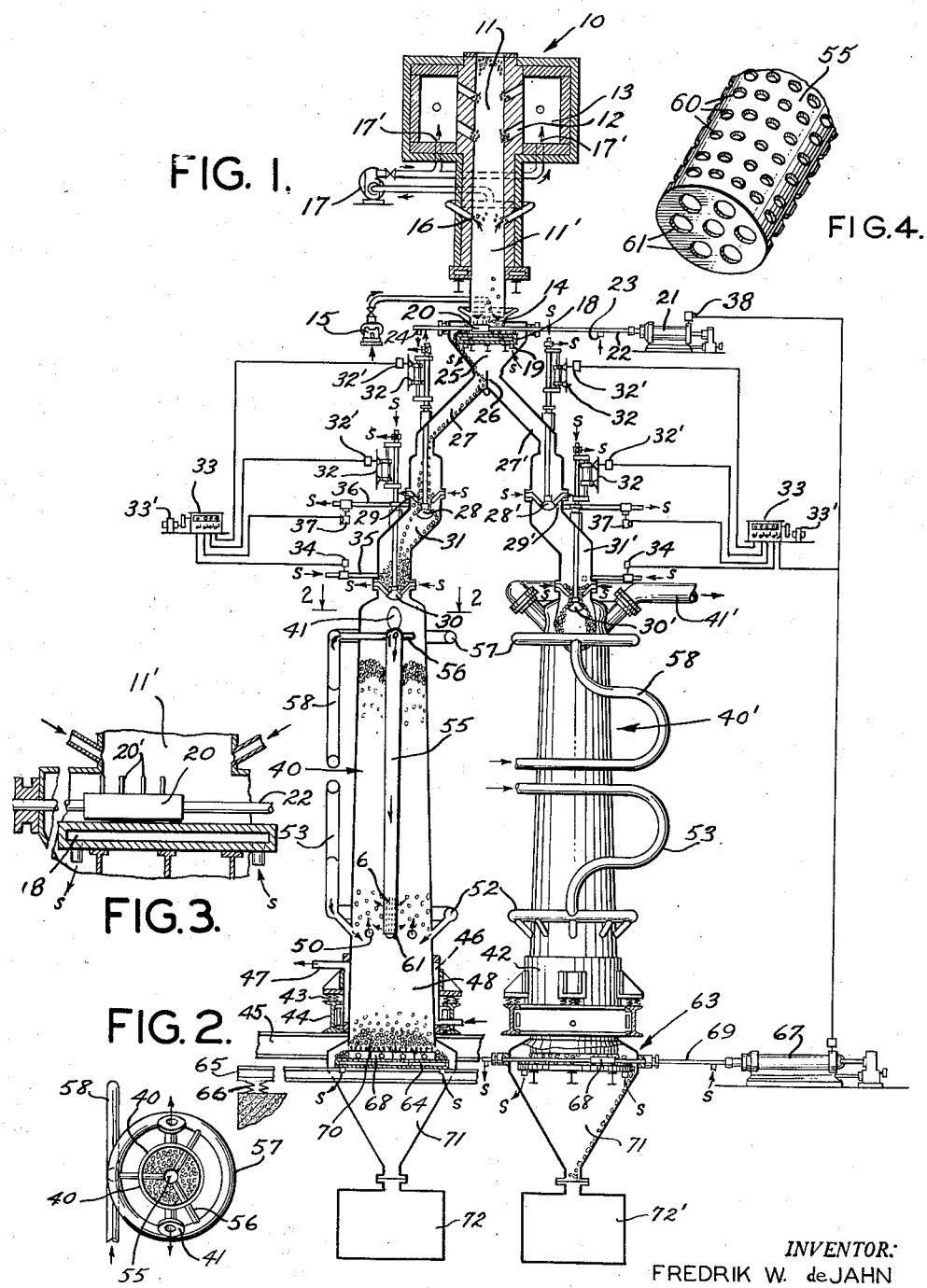
April 8, 1952     F. W. DE JAHN     2,591,789
APPARATUS FOR REDUCING METALLIC OXIDES
Filed June 24, 1948
*INVENTOR:*
FREDRIK W. deJAHN Patented Apr. 8, 1952

UNITED STATES PATENT OFFICE 2,591,789

APPARATUS FOR REDUCING METALLIC OXIDES

Fredrik W. de Jahn, New York, N. Y., assignor to H. A. Brassert & Company, New York, N. Y., a corporation of Illinois Application June 24, 1948, Serial No. 34,925

4 Claims. (Cl. 266—29)

This invention relates to the reduction of metallic oxides, and has particular reference to apparatus for the direct reduction of oxides of the iron group without fusion.

My copending application Serial No. 688,644, filed August 6, 1946, now U. S. Patent 2,548,876, discloses a baking furnace in cooperative association with a reducing furnace, together with charge measuring and feeding mechanism. In the baking furnace, a column of discrete nodules, preferably formed of water-moistened finely-divided iron oxide, are heated to substantially red heat to harden and dry them, this heating being conducted in an excess of air so as to convert any magnetic iron oxide into hematitic oxide, which is more readily reduced without sticking by a preheated reducing gas such as hydrogen, carbon monoxide, mixtures thereof, and the like. The baking furnace gravity-discharges the hematitic baked nodules through a cooling zone, to lower their temperature to a point at which they can be valved to a measuring mechanism, which in turn gravity-discharges the nodules in predetermined, regular batches to a vertical reducing furnace wherein the oxide nodules are treated with a preheated reducing gas at temperatures on the order of 900° C. whereby the fine oxide particles constituting the nodule matrix are reduced to the desired degree without fusion and without sticking. The reduced nodules descend through a cooling zone constituting the lower end of the reducing furnace shaft and are then valved to storage under a neutral atmosphere by a mechanism which operates in synchronism with the aforementioned measuring and feeding mechanism leading from the baking furnace to the reducing furnace. The nodules may be cooled by heat-exchange with the infeed reducing gas, the cooling being effected to a temperature below the pyrophoric range if the nodules are discharged to the atmosphere or to subsequent processing equipment not operating in a neutral atmosphere.

The present invention constitutes an improvement on the apparatus disclosed in the aforementioned application and comprises substantially the same essential elements, namely, an oxidizing baking furnace to harden the nodules and effect hematitic conversion of magnetic oxides therein, together with at least one vertical reducing furnace to which the baked nodules are supplied in measured quantities at timed intervals after being cooled to temperatures such that they may be transferred by gravity without injury to valving mechanism, such as mechanically operated bells synchronized to feed predetermined, measured quantities at proper intervals to the reducing furnace. The cooling of the nodules in this way is effected by air which is forced into the lower end of the baking furnace shaft for upward flow in heat-exchange relation with the hot nodules so as to cool the same while preheating the air which is then transferred, from a point in the shaft below the baking zone, to the separate combustion chambers as secondary air in the production of the nodule-baking gases supplied to the baking zone. In this way heat is conserved efficiently.

The discharge mechanism of the baking furnace includes a reciprocating rake discharging the hot nodules alternately to one side and then to the other for division between two chutes leading to the corresponding measuring mechanisms of two vertical reducing furnaces. Each measuring mechanism is a hopper whose entrance is controlled by a bell which is normally open when the rake discharges baked nodules to the corresponding chute, while a bell at the lower end of the hopper is normally closed. The corresponding bells of the other hopper leading to the second reducing furnace operate in the reverse order in that they are opened and closed in synchronism with but in alternate relation to the opening and closing movements of the bells of the first hopper, so that one hopper is discharging a measured quantity of nodules into the corresponding reducing furnace while the other hopper is being filled.

In order to preclude entry of air into the reducing furnace with the nodules a flow of steam is maintained through the measuring hoppers, entering the lower end of the hopper above the bell and being discharged with any air from the upper end of the hopper at a point below the upper bell. Preferably the steam pressure within a full hopper is permitted to build up to a degree somewhat in excess of the pressure in the corresponding reducing furnace, so as to prevent leakage of combustible gases into the hopper. When the bells are in operation, the operation of the rake discharge mechanism of the baking furnace is halted to preclude jamming of nodules between the upper bell and its closing hopper.

A time control mechanism effects alternate opening of the lower bells feeding nodules to the two reducing furnaces so as to maintain a uniform level of charge in the reducing furnaces, and their operation is synchronized with the operation of the discharge mechanism from the reducing furnace so that the latter discharges a proper volume of reduced nodules corresponding to that introduced into the furnace, in order that a substantially constant volume of nodules may be maintained in the reducing furnace.

The reducing furnace comprises an upwardly tapered cylindrical shaft having reducing gas feeding means adjacent its lower end, the reducing gas being preheated sufficiently to raise the temperature of the nodules to the reducing temperature but below the fusion temperature. The reducing gas is divided, one-half being introduced around the periphery of the furnace through ports leading from a bustle ring and the other half introduced at about the same level by being discharged from the lower end of a vertical tube extending downwardly from the upper end of the reducing furnace, where it receives the reducing gas from a bustle ring. The center gas distributing tube is preferably tapered downwardly to preclude hanging of the charge. Although a single gas supply may be employed, it is preferred that the total gas be equally divided between the peripheral ports and the center tube whereby uniform reducing gas distribution through the charge is afforded, thus making possible the use of large capacity reducing furnaces with correspondingly large output.

The residence time of the nodules in the reducing furnaces is predetermined by the timing mechanism operating the feed bells and the reducing furnace discharge mechanism which is preferably a hydraulically-operated reciprocating rake similar to that regulating the discharge of the nodules from the baking furnace. The rate of reciprocation of the rake of this discharge mechanism is regulated to afford a residence time in the reducing furnace to effect the desired degree of reduction of the nodules before they reach the cooling zone at the lower end. The temperature to which the nodules are cooled in the cooling zone depends upon the next processing step, e. g., if the nodules are to be compacted into finished or semi-finished products, the temperature is retained higher than where the nodules are to be discharged to atmosphere, in which case they must be cooled below the pyrophoric range.

For a more complete understanding of the invention, reference may be had to the accompanying drawings in which Figure 1 is an axial section through the baking and reducing furnace combination of this invention; Fig. 2 is a transverse section therethrough as seen along the line 2—2 of Fig. 1 showing the center position of the gas distributing tube for the reducing furnace; Fig. 3 is an enlarged section of the nodule distributing rake mechanism, and Fig. 4 is a perspective view of the lower end of the gas distributing tube.

Referring to Fig. 1 of the drawing, numeral 10 designates the baking furnace to which the wet nodules, formed of water-moistened finely divided iron oxide, are supplied for downward gravity flow as a vertical column for drying and baking in the heating zone constituting the upper portion of vertical shaft 11. The products of combustion which heat the nodules, enter the shaft through the ports 12 from the combustion chambers 13, which are preferably positioned at opposite sides of the baking furnace shaft 11 as shown. The nodules are baked in shaft 11 at a red heat temperature of between 1050° to 1350° C., preferably about 1150° C. until hardened without fusion, so that they become substantially non-friable and self-sustaining. Preferably the combustion gases entering shaft 11 through ports 12 contain an excess of air so as to oxidize to hematitic oxide any magnetic oxide that may be contained in the nodules. As described in copending application Serial No. 688,644, by H. A. Brassert and applicant, this hematitic conversion minimizes the sticking problem and also facilitates the reduction of the oxide by a mixture of carbon monoxide and hydrogen, which occurs at a rate three to four times as fast as with magnetite under like conditions, and with a correspondingly smaller volume of carbon monoxide and hydrogen.

After being baked in the baking zone at the upper end of the shaft 11, the nodules descend by gravity to the cooling zone 11' at the lower end of the baking furnace 10, where they are cooled to a temperature of approximately 900° C. by air forced through lower ports 14 by means of a blower or other pump 15. After passing upwardly in heat exchange and counter-current flow with the descending hot nodules this air is withdrawn through ports 16 in the upper end of the cooling zone 11' by a suction fan 17 which supplies the preheated air through ports 17' to the combustion chambers 13 as secondary air for the combustible fuel-and-air mixture supplied to burners.

The lower end of the baking furnace 10 is substantially closed by a square, hollow, horizontal plate 18 which is cooled by steam supplied to pipes 19 from a suitable source designated S throughout the drawings in the interest of simplification. This cooling steam prevents warping and other heat injury to the plate 18 and also to the discharge mechanism which cooperates therewith. As shown especially in enlarged section of Fig. 3 this discharge mechanism consists of a rake 20 comprising a hollow transverse box with top pins 20' and reciprocated in a horizontal direction across the upper surface of the plate 18 by a hydraulically-operated power cylinder 21 whose piston is connected to rake 20 by a hollow shaft 22 to which steam is supplied through pipe 23 for circulation through the rake and discharged therefrom by pipe 24. In its reciprocating movement which is relatively slow, the pins 20' of the rake 20 work the nodules laterally and the body thereof pushes and drags the baked nodules uniformly over the opposite edges of the plate 18 so that they flow down the corresponding opposite inclined walls of the hopper 25 which is divided at its lower end by deflecting plate 26 directing the nodules down either chute 27 or 27' depending upon the direction of movement of the rake 20, as will be readily understood. In this way, substantially equal quantities of baked nodules are discharged down chutes 27 and 27' at alternate intervals to descend through the corresponding bells 28 and 28' one of which is open, depending upon the position of the rake 20, while the other is closed. As shown, bell 28 is open when the rake 20 moves toward the left to discharge the baked nodules to chute 27, while bell 28' is closed, and vice versa.

The seats 29 and 29' of the upper bells 28 and 28' respectively, are cooled by steam as indicated by the letter S as are the seats of the corresponding lower discharge bells 30 and 30' which normally close the lower end of the respective hoppers 31 and 31'. Thus, while hopper 31 is filling with nodules, its lower bell 30 is closed and the upper bell 28 is open as shown, whereas at the same time, hopper 31' is discharging through the open lower bell 30' while its upper bell 28' is closed.

Bells 28, 30, 28' and 30' are reciprocated by hydraulically-operated cylinders 32 in the timed relation described, by automatic electric timing mechanism 33 which controls the flow of nodules to and from the corresponding mechanisms by conventional electrical means such as a segmented commutator driven by motor 33'. Each segment energizes its brush to control by solenoid valves 32' the flow of hydraulic fluid to and from the corresponding cylinders 32, in such a way that bells 28 and 30' open and close while bells 30 and 28' close and open in synchronism, except that the bells of hopper 31 operate alternately with the bells of hopper 31' in the manner described.

In order to prevent falling nodules from jamming between closing upper bell 28 and its seat, one of the timing mechanisms 33 is also arranged to control by solenoid valve 38 the flow of hydraulic fluid to rake cylinder 21 and to that end the corresponding commutator is constructed to time the operation of the rake with the bells 28 and 28', including a dwell period for the rake 20 beginning a few seconds before bells 28 and 28' close and ending when they are closed so that no nodules are falling down chutes 27 and 27' when the bells 28 and 28' are closing.

While the upper bell 28 is open to discharge nodules into hopper 31, the timing mechanism 33 energizes solenoid valve 34 to supply a small quantity of steam by pipe 35 to the lower end of the hopper 31 to be expelled at the upper end through pipe 36 whose solenoid valve 37 is similarly energized by the electric control mechanism 33. In this way, while the bell 28 is open, the steam flowing upwardly through hopper 31 prevents the entry of air into hopper 31 with the nodules discharging therein. This is an important feature of the invention, for explosion is thereby precluded by reason of the admixture of air with any reducing gas which might leak past bell 30 upwardly into the hopper 31 at ignition temperatures. Timing mechanism 33 closes steam outflow valve 37 when corresponding upper bell 28 closes, but valve 34 remains open so that steam continues to flow into the hopper 31 after bell 28 is closed until a steam pressure somewhat in excess of the superatmospheric operating pressure in the reducing furnace is reached. Thus if the reducing furnace is operating under the preferred internal pressure of 75 pounds per square inch gauge, the steam pressure is allowed to build up in hopper 31 to from 76 to 78 pounds per square inch gauge before timing mechanism 33 closes electric valve 34 to shut off the supply of steam to hopper 31. The operation of lower bells 30 and 30' accordingly is aided by the one to three pounds steam pressure in hopper 31 or 31', the steam then released at the upper portion of reducing furnaces 40 and 40' doing no harm as it flows out of exhaust pipes 41 and 41' with the gaseous by-products of the reducing reaction to be described.

The reducing furnaces 40 and 40' are identical, and comprise a vertical steel shaft, preferably of circular cross-section as seen in Fig. 2 to withstand substantial internal pressure without exterior bracing. Each shaft tapers upwardly, so as to be narrower at the top than at the bottom, and is supported at the lower end by a structure consisting of a heavy carbon steel ring 42 welded to the shaft and carrying four welded brackets which rest on heavy steel springs 43 interposed between them and steel beams 44 supported on cross beams 45 carried on a suitable foundation. The supporting ring is hollow to form a jacket 46 and water is circulated through it continuously by piping 47, so that supporting ring 42 and the lower end 48 of each of furnace shafts 40 and 40' are cool. The shafts 40 and 40' are thus supported at their coolest points and the springs 43 allow for the thermal expansion thereof without injury. The cooling jacket 46 performs an additional function to be described.

At a level slightly above the cooling zone 48, the furnace shafts 40 and 40' are provided with a series of spaced peripheral gas inlets or ports 50 which are connected by reducing gas feed pipe 53 and bustle ring 52 to a suitable source of reducing gas not shown, but supplying carbon monoxide, hydrogen, or mixtures thereof to the furnaces 40 and 40'. Pipe 53 is provided with an expansion loop to permit thermal expansion without injury. The gas is supplied under a pressure determined by the internal operating pressure of the furnaces which is substantially above atmospheric, say 75 pounds per square inch gauge, in order to secure the benefits of pressure operation as described in Avery Patent No. 2,142,100.

The reducing gas is also preheated so as to provide a reducing gas atmosphere within furnaces 40 and 40' between about 750° C. and 900° C., preferably at about 850° C., considering that the nodules have a temperature of about 900° C. when they are discharged into the furnaces 40 and 40' from hoppers 31 and 31'.

One-half the total volume of reducing gas supplied to each furnace 40 and 40' is introduced through the peripheral gas inlets or ports 50, just described. The other half, under the same conditions of temperature and pressure is supplied by a vertical distributing pipe 55 suspended axially of the corresponding shafts 40 and 40' by its three gas distributing pipes 56 entering the furnace horizontally from the upper bustle ring 57 to which they are connected as is shown particularly in Fig. 2. Bustle ring 57 is supplied with preheated reducing gas under pressure by feed pipe 58 connected to a suitable source and preferably having a separate compressor to insure positive gas supply independent of that supplied to peripheral ports 50, thus dispensing with flow meter orifices, valves, and the like.

The center tube 55 is tapered downwardly to progressively increase the width of the annular space between it and the furnace shaft, so that hanging of the charge between the shaft wall and tube 55 is effectually precluded. The tube 55 is closed at its upper end and extends downwardly so that its lower end reaches at least to the level of the peripheral gas inlets or ports 50. As shown in Fig. 4, the side wall of the tube 55 at its extreme lower end is perforated with spaced openings 60 which are located approximately opposite and at the level of peripheral gas inlets or ports 50, and are preferably grouped slightly above as shown so that gas is distributed uniformly throughout the charge at almost the same level from both sources, even for large diameter furnaces. Thus, if the diameter of the shaft 40 at the ports 50 is 66 inches and the diameter of pipe 55 at its lower end is 6 inches, the annular space is only 30 inches wide, so that under pressure each gas stream need only reach 15 inches to meet the opposite stream.

The center tube gas openings 60 are closely spaced and preferably circular, of a diameter slightly less than that of the nodules, so that the nodules are prevented from entering the tube or jamming in the holes 60. Thus, if the nodules are ¾ inch in diameter, the openings 60 are about ½ to ⅝ inch in diameter. The lower end of the tube 55 is capped by a plate 61, welded in place and preferably provided with a number of holes larger than the diameter of the nodules, so that if any broken nodules having its longest dimension equal to the largest nodule diameter enters the holes 60, as well as the smaller pieces, they will drop through the holes in plate 61 to prevent accumulation of sufficient solid material in tube 55 to interfere with free gas flow therethrough.

Because the distribution of the nodules is uniform around the tube 55, their pressure on the tube is equal around its periphery at any point, so that a relatively light weight gauge metal may be used for the tube 55. Also, because of this uniform peripheral pressure, there are no local pressures on the tube tending to bend or deflect it to one side or the other, nor because of the taper of the tube is there much downward drag thereon, so that the upper end suspension support by the three distributing pipes 56 is sufficient without lower lateral braces interfering with free and uniform descent of the nodules through the furnaces 40 and 40'.

The oxides constituting the nodules are reduced to the degree desired by the rising reducing gas in that portion of the column lying above the level of the gas inlet ports 50 and the lower end of center tube 55. As the reduced nodules descend somewhat below that level, they enter the cooling zone 48, which is the lower end of the shaft enclosed in the water cooling jacket 46 previously described. The hot reduced nodules are cooled in zone 48 to the maximum temperature at which a briquetting press can handle the material, namely, 500° C.

The discharge mechanism 63 is the same as that previously described and shown in Fig. 3 and used for discharging the nodules from the baking furnace 10. Similarly, this mechanism 63 comprises the horizontal steam-cooled plate 64 extending across and positioned slightly below the open lower end of each of the shafts 40 and 40'. Plate 64 is supported on beams 65 in turn supported on springs 66 to accommodate thermal expansion and other loads without injury. Reciprocated slowly across the upper surface of plate 64 by hydraulic cylinder 67 is a steam-cooled rake 68, whose actuating shaft 69 is also steam-cooled, as shown. The upper surface of the rake 68 is provided with pins 70 which work the nodules laterally onto plate 64 and the body of the rake alternately pushes and drags the nodules along and over the opposite edges of the circular plate 64 for discharge into the hopper 71. The residence time in the furnaces 40 and 40' is regulated by controlling with timing mechanism 33 the discharge rate effected by mechanisms 63 relatively to the infeed mechanism. The discharge and infeed rates are about the same, allowance being made for any expansion or shrinkage of the nodules, so that a constant level of charge in furnaces 40 and 40' is maintained at all times. To this end a common control from one mechanism 33 is required for infeed and discharge, as shown.

Hopper 71 contains a neutral or reducing atmosphere and discharges to a briquetting press 72 or the like, also containing a neutral or reducing atmosphere to prevent reoxidation of the reduced material. If iron powder is to be made the nodules from hopper 71 are transferred to another furnace similar to furnaces 40 and 40' but much smaller, where the nodules are subjected to the action of pure hydrogen such as is made in an electrolytic cell. The reason for this is that when mixtures of carbon monoxide and hydrogen are used for reduction there is always some oxide left in the nodules which can only be eliminated by heating in pure hydrogen at temperatures between 750° and 900° C.

The operation of the apparatus of the invention has been explained as the description thereof proceeded, but a brief summary of operations from charging to finishing will be helpful. The wet nodules, preferably formed without substantial compaction, are continuously charged into the shaft 11 of baking furnace 10 to be heated to a temperature of about 1150° C. by counter-flowing combustion gases discharged into the shaft 11 through ports 12 from combustion chambers 13. As the nodules slowly descend through shafts 11 by gravity the heat expels the water from the interstices between the particles forming the nodules, leaving a hard porous matrix whose particles are welded together without fusion. In the lower portion 11' of the shaft 11, the nodules are cooled to about 900° C. by counter-flowing air introduced by blower 15 through ports 14, this air being accordingly highly heated and withdrawn from shaft 11 through ports 16 by fan 17 and introduced into combustion chambers 13 as secondary air, whereby heat is effectively conserved while cooling the nodules down to a temperature at which they can be handled by valving mechanism without injury to the latter. The secondary air thus provided is in excess of that required for combustion, so that the combustion gases in baking furnace shaft 11 may oxidize to hematitic oxide any magnetic oxide in the nodules.

The descending nodules come to rest on a steam-cooled plate 18 extending across the open lower end of the shaft 11 of baking furnace 10. A rake 20 is reciprocated slowly across the plate 18 by hydraulic cylinder 21 to alternately drag and push the baked nodules over the opposite edges of plate 18 for division between the corresponding chutes 27 and 27', as shown in Fig. 1. The rate of flow of the nodules through baking furnace 10 is predetermined by this discharge mechanism, which is in turn regulated by adjusting the rate of rotation of motor 33' driving the commutator of automatic timing mechanism 33. This rate accordingly controls the time of operation of the several synchronized mechanisms 32, 34, 37 and 67 energized by 33, although the time of operation thereof relatively to hydraulic cylinder 21 is fixed during any one sequence of operations. However, the relative operating times of the several enumerated mechanisms also may be adjusted at 33, simply by adjusting the several commutator segments, or the brushes, relatively to each other and then locking them in place in a known manner.

The chutes 27 and 27' discharge the substantially equal quantities of nodules to the corresponding measuring hoppers 31 and 31', one of which is open to receive the nodules while the other is closed by its bell 28 or 28'. When an upper bell, say 28, is open the lower bell 30 is closed, so that the nodules accumulate in hopper 31 up to the requisite volume, whereupon upper bell 28 is closed by its hydraulic cylinder 32 as its solenoid valve 32' is energized by timing mechanism 33, rake 20 meanwhile being temporarily halted by mechanism 33 to stop the nodule discharge while upper bell 28 is closing in order to prevent interference with its closure by jamming nodules.

Also, while hopper 31 is filling, air-purging steam is introduced therethrough by lower inlet pipe 35 and upper outlet pipe 36, by means of respective solenoid valves 34 and 37 controlled by mechanism 33. After upper bell 28 closes, steam valve 37 is closed but steam continues to flow into hopper through valve 34 which remains open until a pressure in hopper 31 is built up to a point slightly above the operating pressure of corresponding reducing furnace 40 before valve 34 is closed by mechanism 33. This pressure prevents reducing gas from entering hopper 31 and also aids the opening of lower bell 30. Meanwhile hopper 31', operated alternately by mechanism 33, is discharging into corresponding reducing furnace 40', its lower bell 30' being open, as shown.

The measured quantities of nodules are discharged from hoppers 31 and 31' into the corresponding reducing furnaces 40 and 40' at such intervals as to maintain a substantially constant level in the furnaces at all times, the discharge from the latter by rake mechanism 63 being controlled by timing mechanism 33 in accordance with the residence time required for the desired reduction of the oxide nodules by the reducing gas at reducing temperatures of between about 750° and about 900° C., preferably about 850° C.

The reducing gas is introduced to each furnace 40 and 40' at a superatmospheric pressure to maintain a preferred static internal pressure of about 75 pounds and at a predetermined temperature such as to maintain the given reducing temperature. The gas is introduced at two independent points, one-half by way of feed pipe 53 and the other half by feed pipe 58. Feed pipe 53 supplies peripheral ports 50 and feed pipe 58 supplies center tube 55 which discharges the gas through its lower end openings 60 at the center of the charge, for upward percolation through and around the porous nodules to reduce the same to the desired degree which depends upon the reducing temperature, the nature of the gas, the internal furnace pressure, and the residence time. As stated, the preferred temperature is about 850° C., below the fusion temperature of the charge. The residence time is the same for both furnaces, so that internal pressure and gas composition are the only independent variables that are available to be adjusted, if different reducing conditions in furnaces 40 and 40' are desirable. Thus by using hydrogen or greater pressure, or both, in one furnace, more complete reduction in the same period of time may be obtained as compared to the other furnace, simultaneously to produce products of different characteristics, for subsequent processing at 72 and 72' after cooling in zone 48, as described.

Although a preferred embodiment of the invention has been illustrated and described herein, it is to be understood that the invention is not limited thereby, but is susceptible of changes in form and detail within the scope of the appended claims.

I claim:

1. In apparatus for reducing metallic oxide at a temperature below the fusion temperature of the oxide and the reduced oxide, the combination of a substantially vertical furnace shaft, means for charging the metallic oxide to the upper end of said shaft, at least one vertical tube within said shaft and having a discharge opening near the lower end of said shaft, reducing gas outlets spaced around the periphery of said shaft near the lower end thereof, a source of preheated reducing gas connected to said peripheral gas outlets and to the upper end of said tube, whereby the reducing gas is simultaneously discharged through said peripheral gas outlets and conducted downwardly through said tube for discharge near the lower end of said shaft and a discharging mechanism at the bottom of said shaft operated in timed relation to said charging means to discharge the reduced solid oxide from said shaft at a rate to maintain said shaft substantially full.

2. In apparatus for reducing metallic oxide at a temperature below the fusion temperature of the oxide and the reduced oxide the combination of a substantially vertical furnace shaft, means for charging the metallic oxide to the upper end of said shaft, a tube extending axially of said shaft and having a discharge opening near the lower end of said shaft, reducing gas outlets spaced around the periphery of said shaft near the lower end thereof, a source of preheated reducing gas connected to said peripheral gas outlets and to the upper end of said tube, whereby the reducing gas is simultaneously discharged through said peripheral gas outlets and conducted downwardly through said tube for discharge near the lower end of said shaft and a discharging mechanism at the bottom of said shaft operated in timed relation to said charging means to discharge the reduced solid oxide from said shaft at a rate to maintain said shaft substantially full.

3. In apparatus for reducing metallic oxide at a temperature below the fusion temperature of the oxide and the reduced oxide, the combination of a substantially vertical furnace shaft, means for charging the metallic oxide to the upper end of said shaft, at least one vertical tube within said shaft and having a discharge opening near the lower end of said shaft, reducing gas outlets discharging into said shaft at spaced peripheral points substantially opposite the discharge opening of said tube, a source of preheated reducing gas connected to said peripheral gas outlets and to the upper end of said tube, whereby the reducing gas is simultaneously discharged through said peripheral gas outlets and conducted downwardly through said tube for discharge near the lower end of said shaft and a discharging mechanism at the bottom of said shaft operated in timed relation to said charging means to discharge the reduced solid oxide from said shaft at a rate to maintain said shaft substantially full.

4. In apparatus for reducing metallic oxide at a temperature below the fusion temperature of the oxide and the reduced oxide, the combination of a substantially vertical furnace shaft, means for charging the metallic oxide to the upper end of said shaft, a tube extending axially of said shaft and having a discharge opening near the lower end of said shaft, reducing gas outlets discharging into said shaft at spaced peripheral points substantially opposite the discharge opening of said tube, a source of preheated reducing gas connected to said peripheral gas outlets and to the upper end of said tube, whereby the reducing gas is simultaneously discharged through said peripheral gas outlets and conducted downwardly through said tube for discharge near the lower end of said shaft and a discharging mechanism at the bottom of said shaft operated in timed relation to said charging means to discharge the reduced solid oxide from said shaft at a rate to maintain said shaft substantially full.

FREDRIK W. DE JAHN.

REFERENCES CITED

The following references are of record in the file of this patent:

UNITED STATES PATENTS

| Number | Name | Date |
|---|---|---|
| 88,741 | Rohrer | Apr. 6, 1869 |
| 722,254 | Ruthenberg | Mar. 10, 1903 |
| 1,121,559 | Heslewood | Dec. 15, 1914 |
| 1,746,904 | Pike | Feb. 11, 1930 |
| 1,809,324 | Austin et el. | June 9, 1931 |
| 1,916,112 | Maier | June 27, 1933 |
| 2,112,643 | Baensch et al. | Mar. 29, 1938 |
| 2,142,100 | Avery | Jan. 3, 1939 |
| 2,340,346 | Riveroll | Feb. 1, 1944 |
| 2,445,092 | Utterback | July 13, 1948 |
| 2,464,304 | Gottlieb | Mar. 15, 1949 |

FOREIGN PATENTS

| Number | Country | Date |
|---|---|---|
| 665,124 | Germany | Sept. 17, 1938 |